United States Patent
Reed, Jr. et al.

(10) Patent No.: US 6,286,381 B1
(45) Date of Patent: Sep. 11, 2001

(54) GEAR PRESELECT SYSTEM FOR AN ELECTRO-MECHANICAL AUTOMATIC TRANSMISSION HAVING DUAL INPUT SHAFTS

(75) Inventors: Richard G Reed, Jr., Royal Oak; Jeffrey R. Cherry, Troy, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/465,903

(22) Filed: Dec. 17, 1999

(51) Int. Cl.$^7$ ................................................. F16H 59/00
(52) U.S. Cl. ............................................................ 74/336 R
(58) Field of Search .................................. 74/336 R, 339, 74/340

(56) References Cited

U.S. PATENT DOCUMENTS

| | | | |
|---|---|---|---|
| 4,622,866 | * 11/1986 | Ito et al. .............................. | 74/336 R |
| 4,627,312 | * 12/1986 | Fujieda et al. ...................... | 74/336 R |
| 5,315,514 | * 5/1994 | Steeby et al. ....................... | 74/336 R |
| 5,444,623 | * 8/1995 | Genise ................................. | 74/336 R |
| 5,655,408 | * 8/1997 | Sakakiyama et al. ............. | 74/336 R |
| 5,711,409 | * 1/1998 | Murata ................................ | 74/336 R |
| 5,890,392 | * 4/1999 | Ludanek et al. ................... | 74/339 X |
| 6,044,719 | * 4/2000 | Reed, Jr. et al. ....................... | 74/330 |
| 6,067,495 | * 5/2000 | Fliearman et al. ................ | 477/120 X |

\* cited by examiner

Primary Examiner—Charles A Marmor
Assistant Examiner—Roger Pang
(74) Attorney, Agent, or Firm—Mark P. Calcaterra

(57) ABSTRACT

A gear preselect system is provided for a transmission having dual input shafts in order to delay a gear preselect change until the last moment possible. The transmission controller determines the speed at which the next shift will occur and determines the preselect speed at which the preselect should occur in order for the preselect to take place prior to the time for shifting to the next gear. When the current vehicle speed is equal to or greater than the preselect speed, the transmission controller preselects the next higher gear.

2 Claims, 6 Drawing Sheets

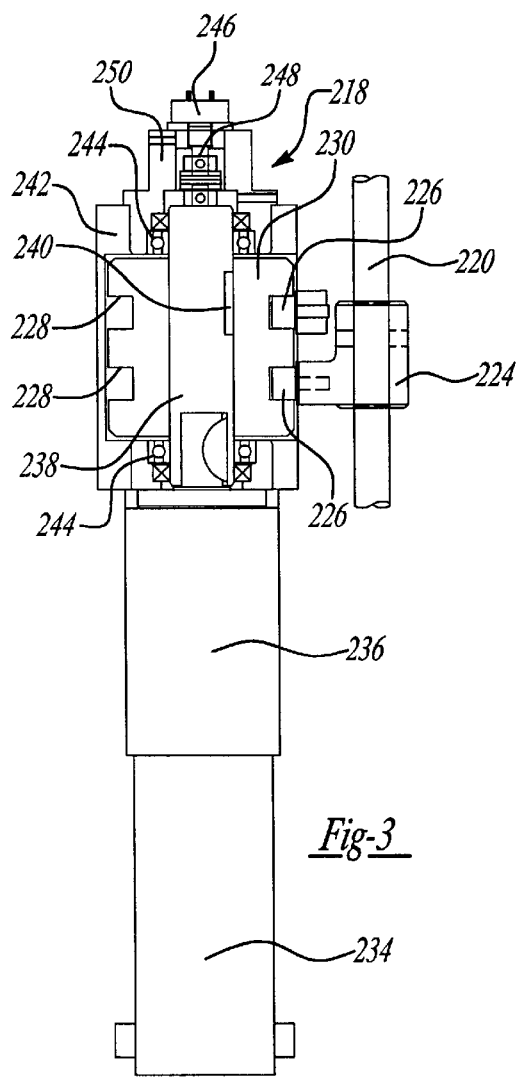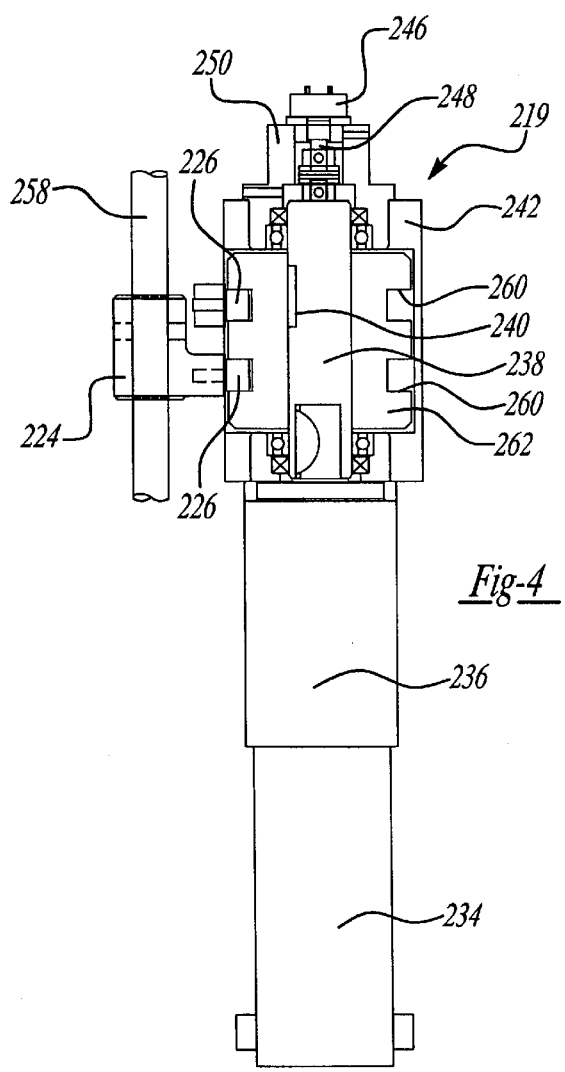

GEAR PRESELECT SYSTEM FOR AN ELECTRO-MECHANICAL AUTOMATIC TRANSMISSION HAVING DUAL INPUT SHAFTS

BACKGROUND OF THE INVENTION

Field of the Invention

The present invention relates to an automatic transmission, and more particularly, a gear preselect system for an electromechanical automatic transmission having dual input shafts.

BACKGROUND

There are presently two typical power transmissions in use on the conventional automobile. The first, and oldest, type of powertrain is the manually operated powertrain. These powertrains are typically characterized in that vehicles having manual transmissions include a clutch pedal to the left of a brake pedal and a gear shift lever which is usually mounted at the center of the vehicle just behind the dashboard. To operate the manual transmission, the driver must coordinate depression of the clutch and accelerator pedals with the position of the shift lever in order to select the desired gear. Proper operation of a manual transmission is well known to those skilled in the art, and will not be described further herein.

In a vehicle having an automatic transmission, no clutch pedal is necessary. The standard H configuration of the shift lever is replaced by a shift lever which typically moves back and forth. The driver need only select between park, reverse, neutral, drive, and one or two low gears. As is commonly known in the art, the shift lever is placed in one of several positions having the designator P, R, N, D, 2, and maybe 1 which corresponds to Park, Reverse, Neutral, Drive, and one or two low gears, respectively. Vehicle operation when the gear shift lever is placed in one of these positions in well known in the art. In particular, when in the drive mode, the transmission automatically selects between the available forward gears. As is well known, older systems typically included first, second and third gears, while newer systems include first through third gears as well as fourth and possibly a fifth and sixth overdrive gear. The overdrive gears provide an improved fuel economy at higher speeds.

As is well known, early transmissions were almost exclusively manually operated transmissions. With a steady development of automatic transmissions, drivers increasingly gravitated toward the easy operation of automatic transmissions. However, in the mid 1970s, rising concerns about present and future fossil fuel shortages resulted in an implementation of corporation average fuel economy regulations propagated in several countries. These fuel economy requirements necessitated the investigation of increasing the fuel economy of motor vehicles in order to meet government regulations. These government regulations prompted a gradual return to manual transmissions which are typically more efficient than automatic transmissions.

In the ensuing years, many mechanically operated vehicle systems were replaced or at least controlled by electronic control systems. These electronic control systems greatly increased the fuel efficiency of vehicle engines and enabled a gradual return to the convenience of automatic transmissions. In addition, electronic controls used with automatic transmissions, greatly improved the shift schedule and shift feel of automatic transmissions and also enabled implementation of fourth and fifth overdrive gears thereby increasing fuel economy. Thus, automatic transmissions have once again become increasingly popular.

Still today, automatic and manual transmissions offer various competing advantages and disadvantages. As mentioned previously, a primary advantage of a manual transmission is improved fuel economy. Conversely, automatic transmissions first and foremost offer easy operation, so that the driver need not burden both hands, one for the steering wheel and one for the gear shifter, and both feet, one for the clutch and one for the accelerator and brake pedal, while driving. When operating an automatic transmission, the driver has both one hand and one foot free. In addition, an automatic transmission provides extreme convenience in stop and go situations, as the driver need not worry about continuously shifting gears to adjust to the ever-changing speed of traffic.

The primary reason for the superior efficiency of the manual transmission over the automatic transmission lies in the basic operation of the automatic transmission. In most automatic transmissions, the output of the engine connects to the input of the transmission through a torque converter. Most torque converters have an input turbine that is connected to the output shaft of the engine and an input impeller that is connected to the input shaft of the transmission. Movement of the turbine at the input side results in a hydraulic fluid flow which causes a corresponding movement of the hydraulic impeller connected to the input shaft of the transmission. While torque converters provide a smooth coupling between the engine and the transmission, the slippage of the torque converter results in a parasitic loss, thereby decreasing the efficiency of the powertrain. Further, the shift operation in an automatic transmission requires a hydraulic pump which pressurizes a fluid for clutch engagement. The power required to pressurize the fluid introduces additional parasitic losses of efficiency in the powertrain.

Before a shift between the gear ratios of a manual transmission can occur, it is necessary to synchronize the rotational speed of the input driveshaft with the rotational speed of the driven output shaft. Typically, synchronization is obtained in a manual transmission by way of a synchronizing mechanism such as a mechanical synchronizer which is well known in the art. The mechanical synchronizer varies the speed of the input driveshaft to match the speed of the driven output shaft to enable smooth engagement of the selected gear set. For example, during an upshift, the mechanical synchronizer utilizes frictional forces to decrease the rate of rotation of the input driveshaft so that the desired speed gear dog clutch is engaged smoothly to drive the desired gear of the output driven shaft. Conversely, during a downshift, the mechanical synchronizer increases the rate of rotation of the driveshaft so that the desired speed gear dog clutch is engaged smoothly to drive the desired gear on the output driven shaft. Typically, with a manual transmission, there is a delay period between disengagement of the currently engaged gear and the subsequent synchronization and engagement of the desired transmission gear. Also, during this process, the clutch connection between the engine output shaft and the transmission input shaft needs to be disengaged prior to the gear shifting process and re-engaged upon synchronization.

SUMMARY OF THE INVENTION

Thus, it is an object of the present invention to provide an electromechanical automatic transmission which utilizes the manual-type transmission design in order to eliminate the parasitic losses associated with the torque converter and the hydraulic controls of conventional automatic transmissions. The electromechanical automatic transmission of the present invention is essentially an automated manual transmission.

The design utilizes a dual clutch/dual input shaft layout. The layout is the equivalent of having two transmissions in one housing. Each transmission can be shifted and clutched independently. Uninterrupted power upshifting and downshifting between gears is available along with the high mechanical efficiency of a manual transmission being available in an automatic transmission. Significant increases in fuel economy and vehicle performance are achieved.

Two independently acting electromechanical shift actuators are provided with barrel-shaped cam members to shift conventional manual synchronizers with dog clutches and blocker rings.

The dual clutch system consists of two dry discs driven by a common flywheel assembly. Two electromechanical clutch actuators are provided to control disengagement of the two-clutch discs independently. Shifts are accomplished by engaging the desired gear prior to a shift event and subsequently engaging the corresponding clutch. The clutch actuators have assist springs to reduce the power needed to disengage the clutches. The actuators also have compensation mechanisms to automatically adjust for clutch disc wear over the life of the clutch discs.

The transmission of the present invention can be in two different gear ratios at once, but only one clutch will be engaged and transmitting power. To shift to the new gear ratio, the driving clutch will be released and the released clutch will be engaged. The two-clutch actuators perform a quick and smooth shift as directed by an on-board vehicle control system using closed-loop control reading engine RPMs or torque. The transmission input shaft that is disengaged can then be shifted into the next gear ratio in anticipation of the next shift. According to the present invention, a gear preselect system is provided in order to delay a gear preselect change until the last moment possible. The transmission controller determines the speed (V2) at which the next shift will occur and determines the preselected speed (V1) at which the preselect should occur in order for the preselect to take place prior to the time for shifting to the next gear. When the current vehicle speed is equal to or greater than the preselect speed (V1), the transmission controller preselects the next higher gear.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 3 is a sectional view of the R-1-3-5 shift actuator according to the principles of the present invention;

FIG. 4 is a sectional view of the 2-4-6-Hill Holder shift actuator according to the principles of the present invention;

DETAILED DESCRIPTION OF THE PREFERRED EMBODIMENTS

Figure 1:
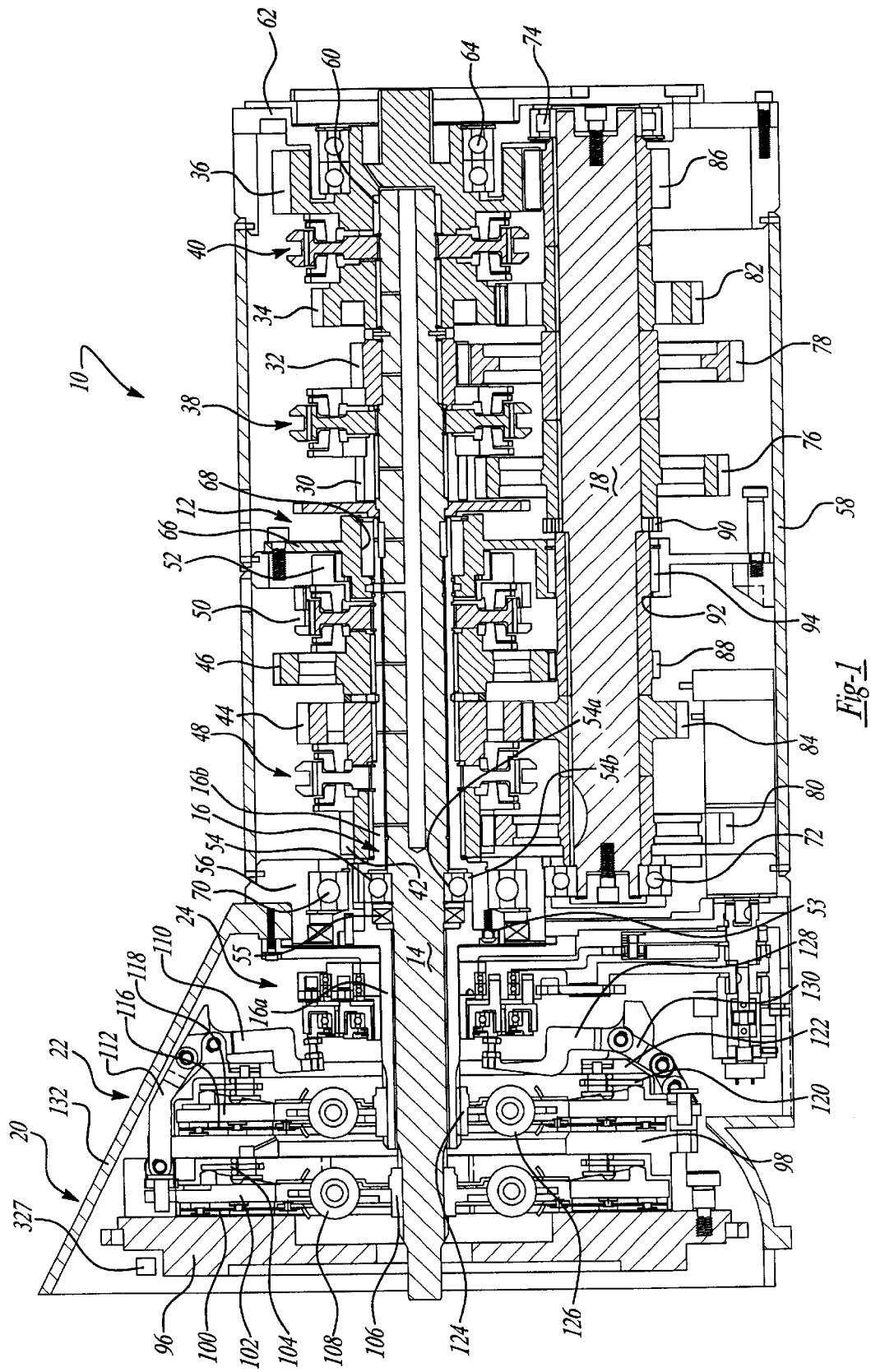
FIG. 1 is a sectional view of the electromechanical automatic transmission according to the principles of the present invention.

With reference to the accompanying drawings, the electro-mechanical automatic transmission 10, according to the principles of the present invention, will now be described. The electromechanical automatic transmission 10 is provided with a gear train 12 which includes a first input shaft 14 and a second hollow input shaft 16 which is concentric with the first input shaft 14. Each of the input shafts 14, 16 support a plurality of rotatably mounted drive gears which are engaged with respective driven gears mounted to a driven shaft 18. A first friction clutch 20 is provided for transmitting torque from the engine output shaft (not shown) to the first input shaft 14. A second friction clutch 22 is provided for transmitting drive torque from the engine output shaft to the second input shaft 16. A dual cam assembly 24, along with first and second clutch actuators (not shown) are provided for selectively disengaging the first and second friction clutches 20, 22. The dual cam assembly 24 and the clutch actuators are described in detail in commonly assigned U.S. patent application Ser. No. 09/153,166 filed Sep. 15, 1998, which is herein incorporated by reference.

The gear train 12 includes a reverse 30, first 32, third 34, and fifth 36 speed gears rotatably mounted to the first input shaft 14. A reverse-first synchronizer device 38 is provided for selectively engaging the reverse gear 30 and first speed gear 32 to the first input shaft 14. A third-fifth synchronizer device 40 is provided for selectively engaging the third and fifth speed gears 34, 36 to the first input shaft 14. Second 42, fourth 44, and sixth 46 speed gears are rotatably mounted to the second input shaft 16. A second-fourth synchronizer device 48 is provided for selectively engaging the second and fourth speed gears, 42, 44, respectively to the second input shaft 16. A sixth speed/hill holder synchronizer device 50 is provided for selectively engaging the sixth speed gear 46 to the second input shaft 16. In addition, the sixth speed/hill holder synchronizer 50 also engages an overrunning one-way clutch (Hill Holder) device 52 for preventing the vehicle from rolling backward down a hill.

The first input shaft 14 is supported by a bearing assembly 54. Bearing assembly 54 has an inner race 54a supported on the first input shaft 14 and an outer race 54b supported on the second input shaft 16. The second input shaft 16 includes a two-piece construction with a first shaft portion 16A and a second shaft portion 16B, each fastened together by a plurality of fasteners and/or pins 53 generally in the vicinity of the bearing 54. In addition, a seal 55 is provided between the first shaft portion 16A of the second input shaft 16 and the first input shaft 14. At a second end, the first input shaft 14 is supported by a needle bearing assembly 60 disposed within a central hub portion of fifth speed gear 36. Fifth speed/transfer gear 36 is supported by the end plate 62 via a bearing assembly 64. A center plate 66 is provided within the housing 58 and is provided with an opening 68 through which the first and second input shafts 14, 16 extend and is supported by a bearing 69. The second input shaft 16 is supported within a front plate 56 of the transmission housing 58 via a bearing assembly 70 which is generally concentric with bearing 54. The driven shaft 18 is supported at a front end by the front plate 56 via a bearing assembly 72 and at a rear end by the end plate 62 via a bearing assembly 74. The driven shaft 18 is provided with a reverse driven gear 76, a first speed driven gear 78, a second speed driven gear 80, a third speed driven gear 82, a fourth speed driven gear 84, a fifth speed/transfer gear driven gear 86, a sixth speed driven gear 88, and a parking gear 90. The driven shaft 18 extends through an opening 92 in center plate 66 and is supported by needle bearing assembly 94.

The first input shaft 14 is drivingly engaged with the engine output shaft via first clutch 20, while second input shaft 16 is engaged with the engine output shaft via second clutch 22. The first and second clutches 20, 22 include a flywheel assembly including a first flywheel 96 which is mounted to the engine output crank shaft (not shown). A second flywheel 98 is mounted to the first flywheel 96 for rotation therewith. The first clutch 20 includes a friction plate 100 disposed between the first flywheel 96 and a pressure plate 102. Pressure plate 102 is biased by a belleville spring 104 into a normally engaged position. The friction plate 100 is engaged with a hub portion 106 which is mounted to the first input shaft 14 via a spline connection. A torsion spring system is provided between the friction plate and the hub 106, as is well known in the art. A lever 110 engages the dual cam assembly 24 and is attached to linkage system 112 which is attached to the pressure plate 102 for disengaging the pressure plate 102 from the friction plate 100 in order to disengage the first clutch 20 upon actuation of the clutch actuator and dual cam assembly 24.

The second clutch 22 similarly includes a friction plate 116 which is disposed between the second flywheel 98 and a pressure plate 118. A belleville spring 120 is provided between the pressure plate 118 and a clutch cover plate 122. The second clutch 22 includes a hub 124 which is connected to the second input shaft 16 by a spline connection. The friction plate 116 is connected to the hub 124 via a torsion spring assembly 126, as is known in the art. A disengagement lever 128 engages the dual cam assembly 24 and is attached to a linkage assembly 130 and is operable in order to disengage the second clutch 22.

The first and second clutches 20, 22 are supported within a bell housing 132 by the flywheel 96 along with the dual cam assembly 24 and clutch actuators 26, 28 (see FIG. 7) which are supported by the bell housing 132. The flywheel 96 is supported by the engine output crank shaft (not shown).

Figure 2:
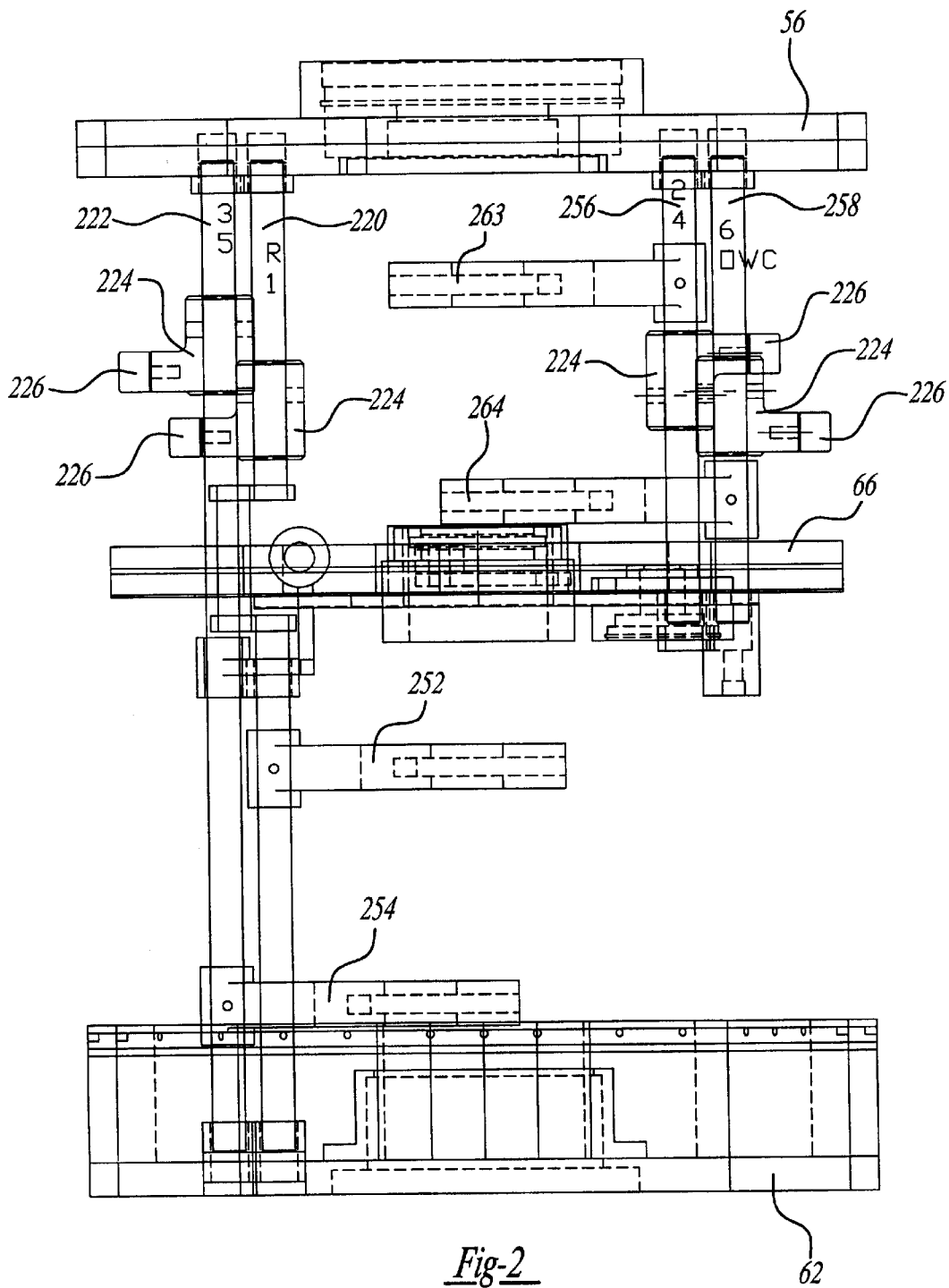
FIG. 2 is a top view of the shift rail assembly according to the principles of the present invention.
Figure 5:
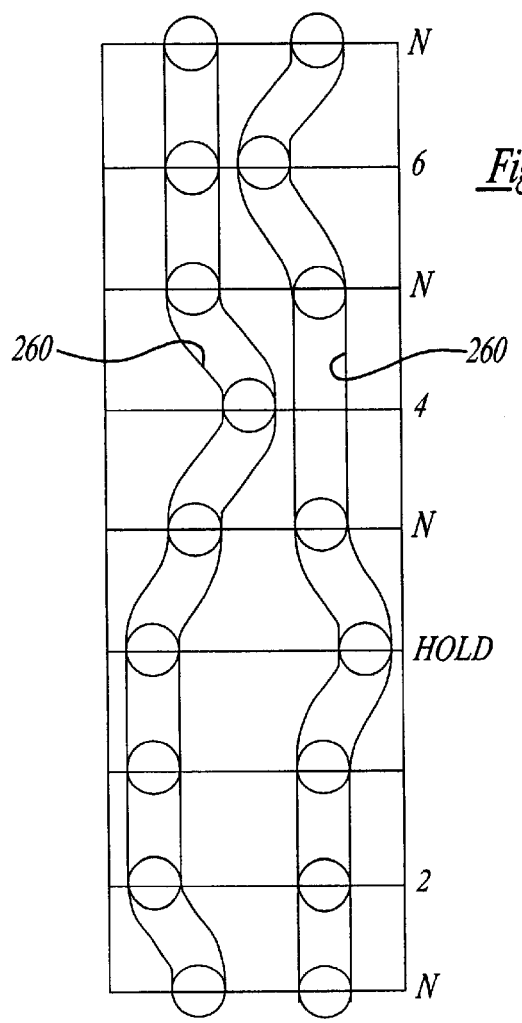
FIG. 5 is an illustration of the cam grooves provided in the 2-4-6-Hill Holder shifter cam according the principles of the present invention.
Figure 6:
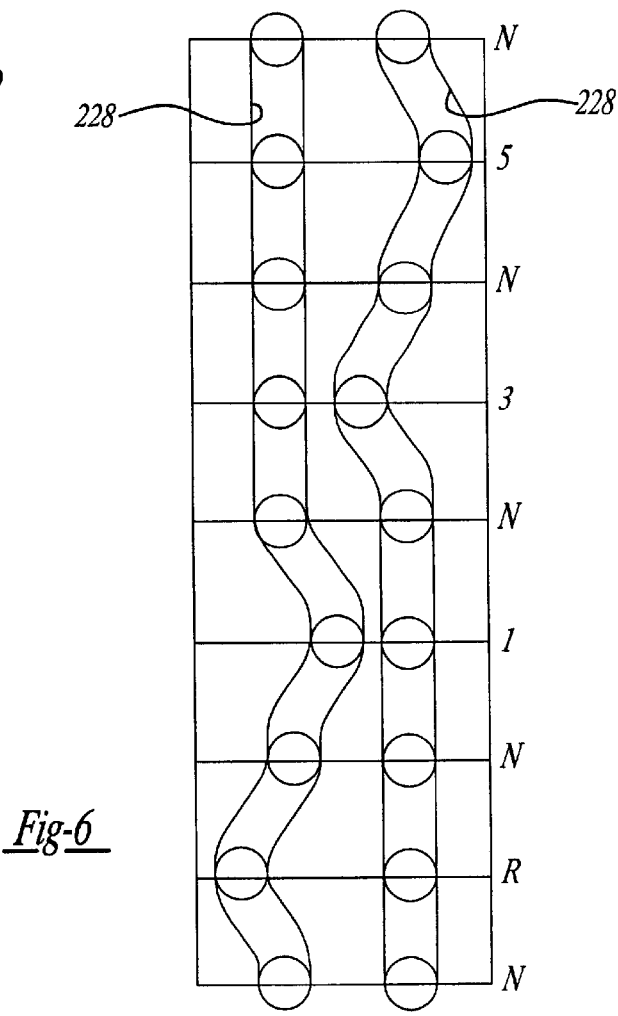
FIG. 6 is an illustration of the cam grooves of the R-1-3-5 shifter cam according to the principles present invention.

The shift actuators 218, 219, according to the present invention will now be described with reference to FIGS. 2–6. The electromechanical automatic transmission 10, according to the present invention, is provided with a first shift rail 220 and a second shift rail 222 each provided with a shift lug 224 securely fastened to the shift rails and each having a cam roller 226 (as shown in FIG. 3) which operatively engage cam grooves 228 provided in a barrel-shaped shifter cam 230 of the R-1-3-5 shift actuator 218. The configuration of the cam grooves 228 for the R-1-3-5 shift actuator 218 is shown in FIG. 6. As shown in FIG. 3, the R-1-3-5 shift actuator 218 includes an electric motor 234 which drives a planetary reduction gear assembly 236. The planetary reduction gear assembly 236 drives a shaft 238 which is connected to the shifter cam 230 by a keyway 240. The shifter cam 230 is provided within a housing 242 and is supported by a pair of bearings 244. A potentiometer 246 is provided for measuring the position of the shifter cam 230. The potentiometer 246 is connected to the shaft 238 by a coupler 248 which is disposed within a housing extension 250. The shifter cam 230, upon rotation, drives shift lugs 224 mounted on first and second shift rails 220, 222 for selectively moving the shift rails and thus the shift forks 252, 254 mounted to the shift rails 220, 222, respectively, as shown in FIG. 2. The shift fork 252 is associated with the reverse-first gear synchronizer device 38. The shift fork 254 is associated with the third-fifth gear synchronizer 40.

The electro-mechanical automatic transmission is also provided with third and fourth shift rails 256, 258, respectively, which are each provided with a shift lug 224 securely mounted to each shift rail 256, 258. Each shift lug 224 includes a cam roller 226 which operatively engage cam grooves 260 provided in the shifter cam 262 of shift actuator 219, as shown in FIG. 4. The cam grooves 260 for the shift actuator 219 are shown in FIG. 5. A 2-4 shift fork 263 is mounted on the shift rail 256 for actuating the second-fourth speed synchronizer 48. A sixth-Hill Holder shift fork 264 is mounted to the shift rail 258 for selectively engaging the sixth-Hill Holder synchronizer 50. With reference to FIG. 4, the 2-4-6 shift actuator 219 has substantially the same construction as the R-1-3-5 shift actuator 218 shown in FIG. 3.

Figure 7:
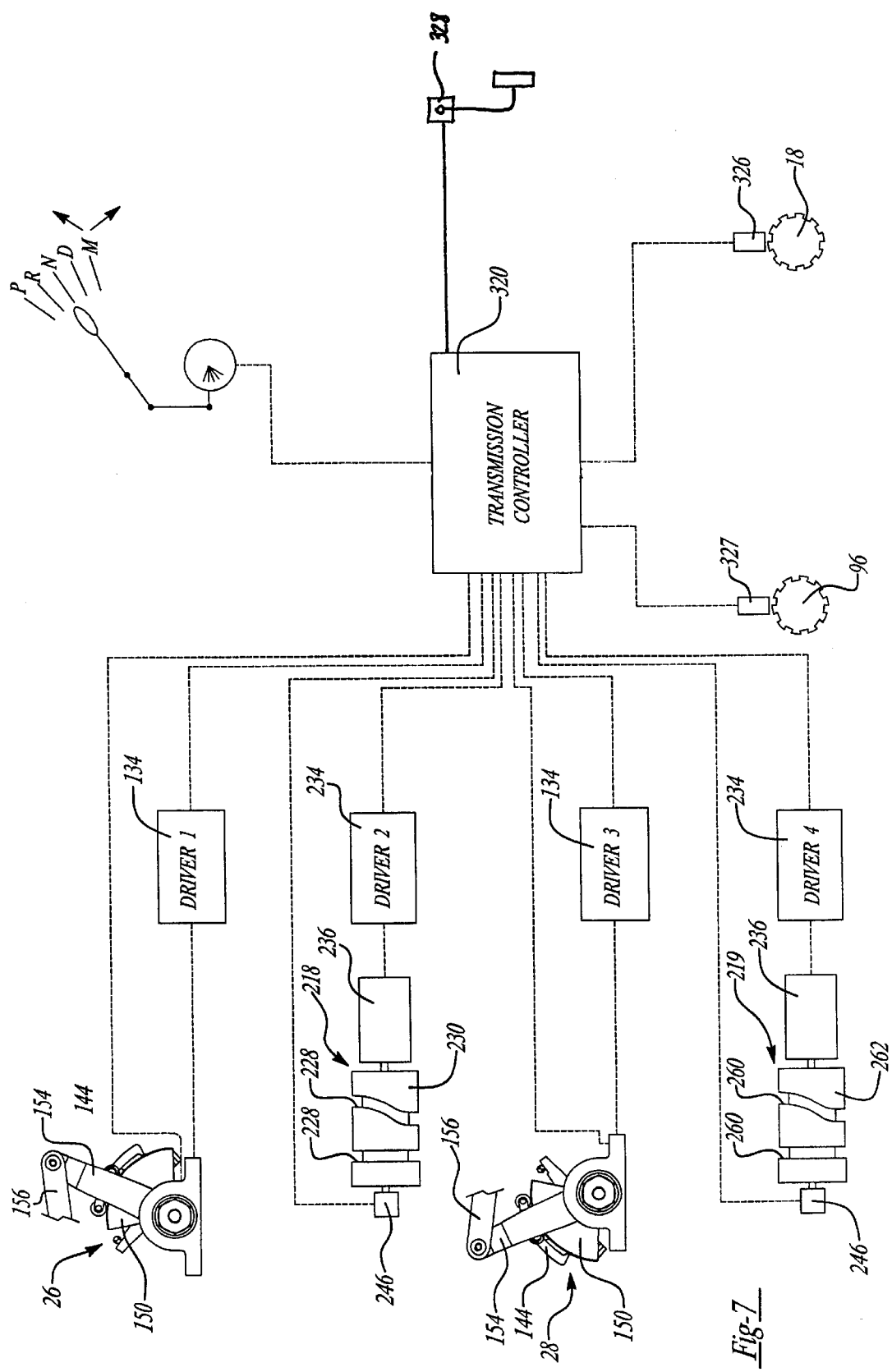
FIG. 7 is a schematic illustration of the control system for the electro-mechanical automatic transmission according to the principles of the present invention.

With reference to FIG. 7, a transmission controller 320 is provided for operating the clutch actuators 26, 28 and the shift actuators 218, 219. The transmission controller 320 provides signals to the driver motors 134 of the clutch actuators 26, 28 as well as to the driver motors 234 of the shift actuators 218, 219. The transmission controller 320 also monitors the position of the clutch actuators 26, 28 via potentiometers (not shown). The controller 320 also monitors the position of the shift actuators 218, 219 via potentiometers 246.

Figure 8:
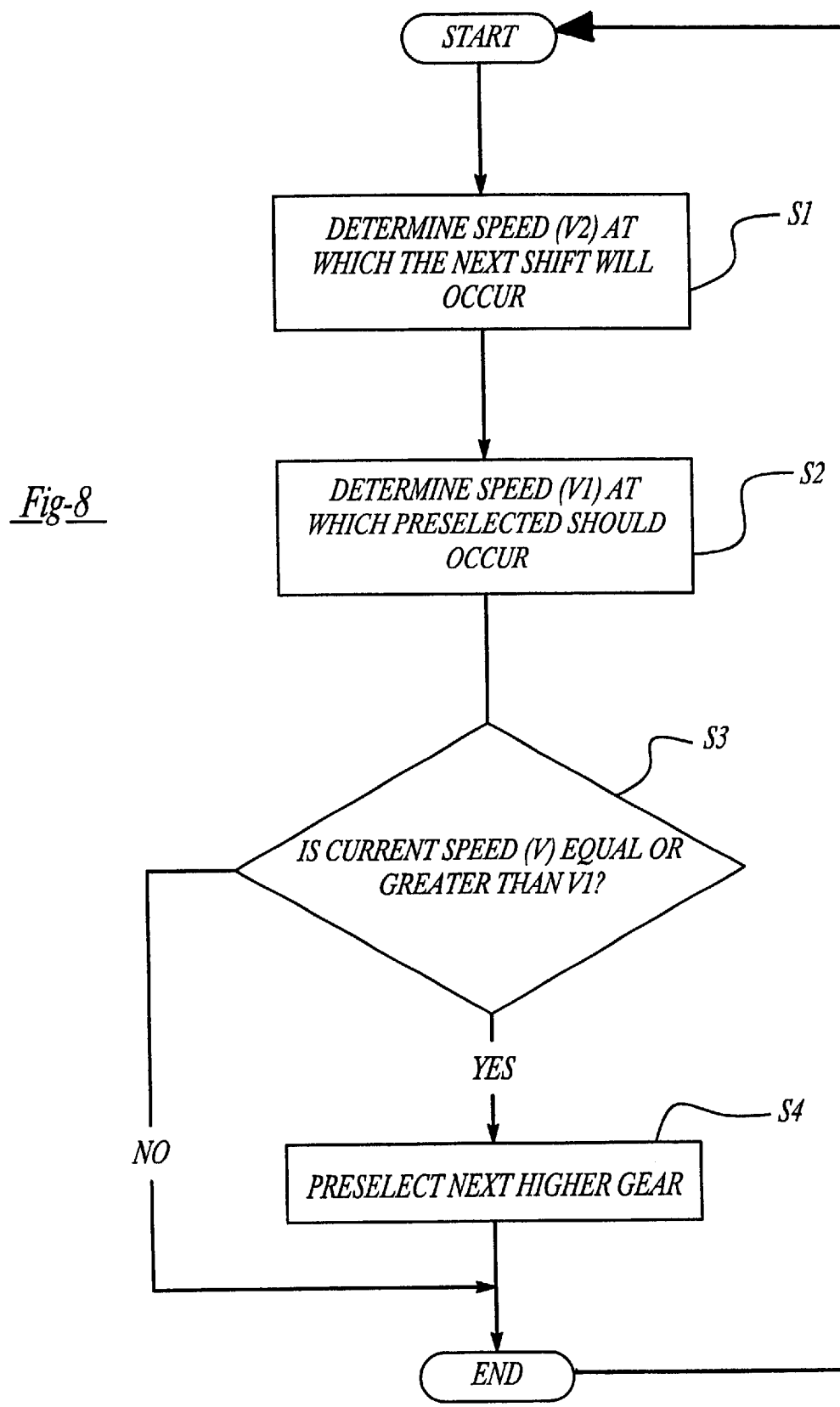
FIG. 8 is a flow diagram illustrating the control scheme of the gear preselect system according to the present invention.

Uninterrupted power shifting between gears is accomplished by engaging the desired gear prior to a shift event. The transmission 10 of the present invention can be in two different gear ratios at once, with only one clutch 20, 22 being engaged for transmitting power. In order to shift to a new gear ratio, the current driving clutch will be released via the corresponding clutch actuator and the released clutch will be engaged via the corresponding clutch actuator. The two clutch actuators perform a quick and smooth shift as directed by the transmission controller 320 which monitors the speed of the input shafts 14 and 16 via speed sensors 322 and 324, respectively, as well as the speed of the driven shaft 18 via a speed sensor 326. Alternatively, the controller 320 can determine the speed of the input shafts 14 and 16 based upon the known gear ratio and the speed of the driven shaft 18 as detected by sensor 326. An engine speed sensor 327 is also provided and detects the speed of the flywheel 96. Based upon the accelerator pedal position as detected by sensor 328, the vehicle speed, and the current gear ratio, the transmission controller 320 anticipates the next gear ratio of the next shift and drives the shift actuators 218, 219, accordingly, in order to engage the next gear ratio while the corresponding clutch actuator is in the disengaged position. As a gear is engaged, the corresponding input shaft which is disengaged from the engine output shaft, becomes synchronized with the rotational speed of the driven shaft 18. At this time, the clutch which is associated with the current driving input shaft is disengaged and the other clutch is engaged in order to drive the input shaft associated with the selected gear. With reference to FIG. 8, the control scheme which is utilized by the controller 320 in order to preselect the next gear is shown. The electromechanical automatic transmission of the present invention has the ability to shift without torque interruption inherent with a standard manual transmission. For optimum fuel economy and performance, shifts must occur at the proper moment in time as determined by various real time vehicle parameters. To achieve shifting without torque loss, the electromechanical automatic transmission of the present invention has the unique requirement to anticipate impending gear changes and preselect the appropriate speed gear before shifting, by swapping clutches. The transmission of the present invention is essentially two manual transmission gear sets in parallel with a common output shaft. As described above, each shaft has interleaved gear ratios and a separate clutch driven from the engine flywheel. At rest, the control system selects first gear 32 on the first shaft 14 and second gear 42 on the second shaft 16. Engaging the clutch 20 on the first shaft 14 launches the vehicle and second gear 42 is available for the next upshift. Second gear 42 is engaged by releasing the clutch 20 on the first input shaft 14 and simultaneously engaging the clutch 22 on the second input shaft 16. At this point, an upshift to third gear or a downshift to first gear is possible. First gear 32 is still selected on the first shaft 14. This allows for a downshift if needed. In order for the upshift to occur at the proper time, the control system must anticipate the next shift point and preselect third gear 34 on the first input shaft 14. The upshift can now occur at the proper moment in time for optimum vehicle performance. This sequence and the need for gear preselects are repeated throughout the entire gear range for both upshift and downshifts. Due to possible changes in throttle position by the driver, it is important to delay preselecting the next higher gear (in an upshift) or the next lower gear (in a downshift) as long as possible. This will prevent preselects that are not needed thus reducing shift times and unnecessary transmission wear.

With reference to FIG. 8, the gear preselect control scheme will now be described. At step SI, the controller determines the speed (V2) at which the next shift will occur. At step S2, the controller also determines the speed (V1) at which a preselect should occur. The speed V1 is determined by using the formula (V2−V1)=(Vehicle Acceleration)×(T2−T1) where V2 equals the speed where a shift needs to take place and V1 is the vehicle speed at which a preselect should occur, T2 is the time where the shift needs to take place, and T1 is the time where the preselect should occur. The value T2−T1 can be set as a predetermined time such as 300 ms or can be retrieved from a look-up table. The time T2−T1 is the time it takes for the shift drum to move from, for example, the first gear engaged position to the third gear engaged position. For each shift, this time may vary, and therefore the use of a look-up table may be desired. However, using a worst case predetermined time, applicable in all shifts, can also be utilized. In the above equation, the value V2 is known from a shift table, the value T2−T1 can be obtained from a look-up table or used as a constant, and the vehicle acceleration can be calculated as the rate of change of vehicle speed over time. From this, the value V1 can be solved according to the equation V1=V2−(A*300 ms). The control then proceeds to step S3 where it is determined if the current speed is equal or greater than the speed V1. If yes, the next higher gear is preselected at step S4. If no, the control sequence ends and begins again at step S1.

According to the above control scheme, at any point in time, the vehicle speeds at which the next upshift and downshift must occur is continuously calculated by the controller. By using the equation V1=V2−(A*(T2−T1)) the next shift can be anticipated. The worst case time for the transmission to perform a gear preselect can be selected as a predetermined value or selected from a look-up table. The controller calculates the vehicle acceleration from a standard vehicle speed sensor. Along with the vehicle speed for the next upshift and downshift, the control system subtracts the result (V2−V1) from the next upshift point and adds the result to the next downshift point. These two new values represent the vehicle speeds when gear preselection must be made. At certain vehicle operating points, the disengaged clutch will be at redline due to a lower gear selected on the disengaged shaft than the engaged shaft. An upshift preselect must occur at this point to reduce the speed and will override any other gear preselection algorithms to protect the transmission.

The unique construction of the electromechanical automatic transmission allows for optimum shift points without torque loss provided a robust gear preselect system is in place. The system outlined herein has been proven in actual use and can be easily modified to "learn" driving habits to further increase performance and fuel economy. Manual transmissions have a variable time for the mechanical synchronizing system to function during gear changes which is based on many factors including speed, wear, temperature, and manufacturing tolerance. For lower cost, less stress, and better durability on the shifting components, especially on large trucks, slow gear preselect motors can be used. The control system easily measures the gear preselect time on a continuous basis and compensates as required to assure optimum vehicle performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission, comprising:
   dual input shafts, each including a plurality of drive gears in meshing engagement with a driven gear mounted on an output shaft; and
   a controller for determining a speed at which a shift will occur and for determining a speed at which a preselect should occur based upon a vehicle acceleration and a predetermined time required to preselect a gear.

2. A gear preselect method is provided for a transmission including dual input shafts, each including a plurality of drive gears in meshing engagement with a respective driven gear mounted on an output shaft, comprising the step of:
   determining a shift speed at which a shift will occur;
   determining a preselect speed at which a gear preselect should occur; and
   engaging a preselected gear on a non-engaged one of said dual input shafts when a vehicle speed reaches said preselect speed.

* * * * *